Patented Aug. 19, 1941

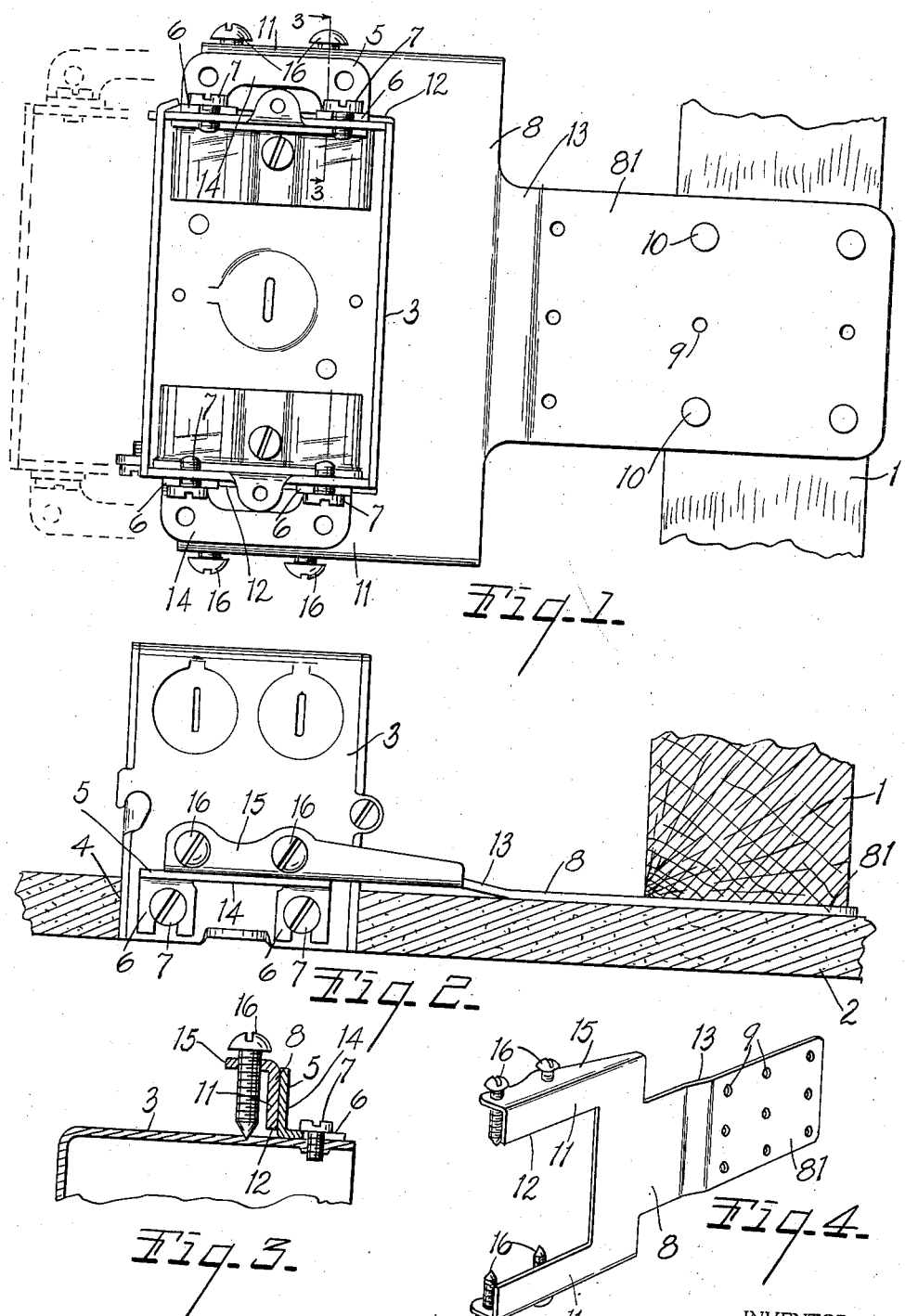

2,252,953

UNITED STATES PATENT OFFICE 2,252,953

MOUNTING BRACKET FOR SWITCH BOXES

Carl E. Walters, Kalamazoo, Mich.

Application April 24, 1939, Serial No. 269,552

10 Claims. (Cl. 220—3.9)

The main objects of this invention are:

First, to provide a novel mounting bracket for standard types of switch or outlet boxes.

Second, to provide a bracket of the type described, which may be readily and quickly erected on a support such as the studding of a building construction and which permits an accurate positioning of the switch or outlet box supported thereby.

Third, to provide a mounting for a switch or outlet box which is exceedingly inexpensive in nature and which furnishes a rigid immovable support for the box.

Fourth, to provide a support or bracket of the type described in combination with a switch or outlet box.

Fifth, to provide a combination of the type described incorporating means for releasably securing the box to the bracket to facilitate the wire or cable connection thereto.

Further objects relating to details and economies of the invention will definitely appear from the description to follow. The invention is defined in the claims.

A structure embodying the features of the invention is illustrated in the accompanying drawing, wherein:

Fig. 1 is a front elevational view of the outlet box and supporting bracket associated in accordance with this invention, a portion of wall studding or other support to which the bracket is fastened being illustrated in part and the manner of removing the box from the bracket being illustrated in dotted lines.

Fig. 2 is a fragmentary top plan view illustrating the assembly of my invention in operative relation to a support or studding and a wall surfacing of plasterboard or the like through which the box opens.

Fig. 3 is a fragmentary view in section taken on line 3—3 of Fig. 1.

Fig. 4 is a perspective view illustrating the bracket element of my invention.

In the erection of outlet or switch boxes in building constructions, it is frequently necessary to employ a special fixture or bracket for supporting the same, for example, on the wall studding, in a desired position to project through the wall board or lath. Numerous types of fixtures of this sort have been proposed, yet most of them are unsatisfactory by reason of insufficient stability or strength, lack of adjustability whereby the box may be sufficiently accurately positioned, or because of excessive cost by reason of the complicated nature thereof, or difficulty of installation, or for other reasons. It is therefore a primary object of my invention to provide a mounting bracket which overcomes the foregoing objections and serves as an effective mounting for standard or widely used boxes.

In the drawing, the reference numeral 1 indicates the upright support or studding of a building construction which is to have an interior wall surfacing such as lath and plaster or wallboard or plasterboard 2 applied thereto. The reference numeral 3 indicates a switch or outlet box of well known type which it is desired to support on the studding 1 in spaced relation thereto prior to application of the wallboard 2, the aforesaid box projecting through an opening 4 formed in the wallboard to receive the same.

Boxes of the type shown and described are frequently provided with attaching means in the form of a pair of oppositely extending L-shaped fixtures 5 or adjustable supporting flanges or ledges, which are laterally slidable on opposed walls of the box to thereby position the supporting fixtures 5 relative to the front of the box. The means for adjustably connecting these lugs or fixtures generally take the form of a pair of slotted ears 6 on the fixture coacting with screws 7 threaded into the box, as illustrated in Figs. 1, 2 and 3. It is a feature of advantage of my invention that it is particularly well adapted for use with a box provided with this type of supporting fixture, utilizing the same to permit an accurate positioning of the box relative to the improved mounting bracket of my invention and to still utilize the fixtures or supports.

This bracket comprises an attaching plate 8 having an attaching wing or flange 81 provided with a plurality of apertures 9 adapted to receive screws, nails or the like 10 for securing the same to the studding 1. Integral with the plate 8 is a box receiving and clamping element 11 having a box receiving recess 12. This box receiving element is offset rearwardly from the attaching plate 8 at 13, the extent of the offset being only sufficient to compensate for the supporting flange 14 of the fixture 5; that is, the offset is equal to the thickness of this flange. In this manner the front of the flange will be flush with the wing 81 for uniform engagement of the wallboard with the flange and studding.

The arms or forks of the box receiving element 11 have rearwardly directed flanges 15 which threadedly receive the pointed box engaging set screws 16, there being two set screws in each flange. The set screws are actuable to engage and clamp the box 3 in the manner illustrated in Figs. 1, 2 and 3. As illustrated in Fig. 3, the set screws become embedded slightly in the wall of the box, and thereby take a secure grip on the same, though it is not desirable to screw the same sufficiently into the surface to inset the walls of the box toward one another a substantial extent.

As is clearly illustrated in Fig. 3, the dimensions of the recess 12 are sufficient to freely receive the box therein, the entire clamping and retaining action being exerted by set screws 16. It will likewise be observed that the flanges of the fixture 5 gauge and position the box receiving element 11 relative to the box as well as to sustain the thrust on the bracket.

The bracket of my invention is preferably formed of relatively rigid stock, that is, sufficiently stiff so that with the box in place thereon, as illustrated in the drawing, the operator may position the wallboard 2 in front of the latter and by tapping the wallboard against the box obtain an impression on the rear of the wallboard sufficient to guide him in forming the opening 4 to receive the box.

Numerous advantages characterize the construction described above. In the first place, it is possible to gauge and position the box on the bracket with considerable accuracy by manipulation of the screws 7 holding the laterally slidable lugs 5. Having properly located the box, the workman is then able to back off set screws 16 and remove the box entirely from its mounting for the purpose of more readily wiring the box in whatever manner is desired. When the wiring has been completed, the box is replaced in recess 12 and the set screws actuated to clamp the same.

A further advantage is that the cost of production of my bracket or mounting is practically negligible as compared to hitherto proposed attaching plates, while the support furnished thereby is amply rigid for all the functions which it is called on to perform. Furthermore, although there are numerous types of outlet or switch boxes now on the market, differing slightly in one way or another, the above described bracket is well adapted for use with any of them, by reason of its simplicity.

I have illustrated the mounting of my invention and the assembly thereof with a switch or outlet box as utilized in connection with a wallboard or plasterboard surfacing, such as is widely used in present day installations; however, it will be apparent to those skilled in the art that my device is likewise adapted for other wall installations, whether plastered or not, including wood lath, expanded metal lath, and the like.

I have illustrated and described my improvements in an embodiment which is very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In combination with a box, a mounting bracket therefor comprising a one-piece plate having an attaching flange provided with apertures adapted to receive members for attachment thereof to a support, and a box clamping element integral with said flange having a recess therein of size sufficient to loosely receive the box, said element having rearwardly directed flanges on the arms thereof, and pointed set screws threaded in said flanges engaging the top and bottom of said box to clamp the same in place, said box having laterally adjustable abutment members on opposite walls thereof coacting with said element to gauge and position and support the latter relative to the box and permit lateral adjustment of the box bracket relative to the box as desired, said box being freely removable from and replaceable in said element following positioning thereof on the latter by manipulation of said set screws.

2. In combination with a box, a mounting bracket therefor comprising an attaching flange adapted for attachment to a support, and a box clamping element having a recess therein of size sufficient to receive the box, said element having rearwardly directed flanges on the arms thereof, and set screws threaded in said flanges engaging the top and bottom of said box to clamp the same in place, said box having means on opposite walls thereof coacting with said element to gauge and position and support the latter relative to the box and permit lateral adjustment of the box bracket relative to the box as desired, said box being freely removable from and replaceable in said element following positioning thereof on the latter by manipulation of said set screws.

3. A supporting bracket for a switch or outlet box comprising a laterally extending attaching portion adapted to be secured to a support, and a box clamping portion having a recess for reception of the box, said clamping portion being offset substantially rearwardly of the attaching portion and having rearwardly directed flanges, said box being insertable in the recess between said flanges, and set screws threaded into said flanges and engageable with said box to clamp the same, said clamping portion being engageable with gauge means on the box, the offset in the bracket compensating for the thickness of said gauge means and causing the same to lie substantially flush with the attaching portion, the gauge means acting as thrust sustaining means in engagement with the bracket.

4. In combination with a supporting bracket for a switch or outlet box comprising a laterally extending attaching portion adapted to be secured to a support, and a box clamping portion having a recess for reception of the box, a box clamped thereby, said clamping portion being offset substantially rearwardly of the attaching portion, said box being insertable in the recess, and means on said clamping portion adjustable transversely and inwardly from the periphery of the recess and engageable with said box to clamp the same, said box having gauge means engageable by said clamping portion, the offset in the bracket compensating for the thickness of said gauge means and causing the same to lie substantially flush with the attaching portion, the gauge means acting as thrust sustaining means in engagement with the bracket.

5. In combination, a switch box having flanges adjustably mounted on opposed walls thereof, and a supporting bracket for said box comprising a plate having an attaching portion adapted to be secured to a wall support, and an integral clamping portion provided with a laterally extending recess adapted to receive said box therein, said clamping portion being engageable with said flanges to position the plate relative to the box as desired by adjustment of said flanges and having a plurality of set screws therein engaging the box for clamping the box when the desired location of the plate relative to the box is determined, said set screws permitting removal of the box from the bracket when desired.

6. In combination, a switch box having flanges adjustably mounted on opposed walls thereof, and a supporting bracket for said box comprising an attaching portion adapted to be secured to a wall support, and a clamping portion provided with a recess adapted to receive said box therein, said clamping portion being engageable with said flanges to position the bracket relative to the box as desired by adjustment of said flanges and having a plurality of set screws therein engaging the box for clamping the box when the desired location of the bracket relative to the box is determined, said set screws permitting removal of the box from the bracket when desired.

7. In combination, a switch box having a pair of adjustable gauges on opposed walls thereof, and a supporting bracket for said box comprising an attaching portion adapted to be secured to a wall support, and a clamping portion offset rearwardly of said attaching portion, said clamping portion having a recess adapted to receive said box therein, said bracket being engageable with said gauges to position the bracket as desired relative to the box by adjustment of said gauges and said clamping portion having threaded means engaging the box for clamping the box when the desired location of the bracket relative to the box is determined, the engagement of said threaded means with the box permitting removal of the box from the bracket when desired.

8. A supporting bracket for a switch or outlet box comprising a one-piece sheet metal plate having a laterally extending attaching portion adapted to be secured to a support, and a box receiving portion, said last-named portion being offset substantially rearwardly of the attaching portion and being adapted to support the box, and set screws threaded in said box receiving portion and engageable with said box to clamp the same, said bracket being engageable with adjustable gauge means on the box to position the same relative to the box.

9. A supporting bracket for a switch or outlet box provided with supporting flanges on opposed walls thereof comprising a plate-like mounting portion and a forked portion adapted to embrace an outlet box at the inner side of its supporting flanges and for supporting engagement therewith, said forks being provided with rearwardly turned flanges at the outer edges thereof having set screws threaded therein for engagement with opposed sides of the box to coact with the supporting flanges in supporting the box on the bracket, the forked portion of the bracket being rearwardly offset to compensate for the said supporting flanges.

10. A supporting bracket for a switch or outlet box provided with supporting flanges on opposed walls thereof comprising a plate-like mounting portion and a forked portion adapted to embrace an outlet box at the inner side of its supporting flanges and for supporting engagement therewith, said forks being provided with rearwardly turned flanges at the outer edges thereof having set screws threaded therein for engagement with opposed sides of the box to coact with the supporting flanges in supporting the box on the bracket.

CARL E. WALTERS.